United States Patent Office 2,760,945
Patented Aug. 28, 1956

2,760,945

PIGMENTED RESIN EMULSIONS AND METHOD OF MAKING SAME

William A. Bodenschatz, Sr., and William A. Bodenschatz, Jr., Brooklawn, N. J., assignors to Fred'k H. Levey Company, Inc., New York, N. Y., a corporation of New York No Drawing. Application September 8, 1951, Serial No. 245,761

9 Claims. (Cl. 260—29.4)

The present invention relates to improved aqueous emulsions of pigmented resins. It provides novel, highly stable pigmented aqueous emulsions especially useful in the printing, dyeing and coating of textiles, paper and the like, herein referred to as fabrics. It also provides a novel and highly useful process for making those emulstions.

A difficulty heretofore experience in the coating or impregnating of fibers with pigmented resin is that resins which are sufficiently water-soluble, or readily emulsifiable in water to form emulsions, do not form sufficiently permanent coatings on the fibers but are readily removed from the fabric, as by repeated washing. On the other hand, resins, such as the water-insoluble thermo-setting resins, which generally form more permanent films, are not readily emulsified to form stable aqueous emulsions for application to the fibers.

An object of our present invention is to produce aqueous emulsions of pigmented resins sufficiently stable to withstand shipment and storage over extended periods and which will readily coat the various commercial fibers used in fabrics and form substantially permanent color-bearing films thereon which will resist repeated washing and other cleaning processes. A still further object of the invention is to produce such emulsions and coatings which will render the fibers water repellent.

These objects are attained by our present invention along with other advantages which will appear from the following description of the invention.

We have discovered that resins of the type generally defined as water-insoluble thermo-setting resins, and which form substantially permanent water-insoluble films on fibers of the type used in fabrics, may be converted to readily emulsifiable resin complexes by mixing and reacting therewith, in a non-aqueous environment, a copolymer of styrene and a partial ester of a polymerizable, unsaturated, polycarboxylic acid containing free carboxyl groups, and that such resin complex, i. e., interaction product is readily emulsifiable with water and can readily be dispersed in water to form a stable aqueous emulsion by neutralizing the carboxyl groups of the acid ester portion of the complex by reacting with a base material, ammonium hydroxide, for instance. These copolymers of styrene and partial esters of the polycarboxylic acid will, for brevity, be hereinafter referred to generally as heteropolymers.

The heteropolymers used in accordance with the present invention may be prepared by copolymerizing styrene in the presence of benzol or xylol with any unsaturated, polymerizable polycarboxylic acid which will react readily with primary or secondary monohydric alcohols to give a partial conversion to the corresponding ester leaving a resin still containing free carboxyl groups, or as described in our copending application Serial No. 168,856, filed June 17, 1950, of which the present application is in part a continuation. One heteropolymer which has been used with particular advantage is the copolymer of styrene and the partial secondary butyl ester of maleic acid containing free carboxyl groups marketed under the trade name Lustrex X-820 by Monsanto Chemical Company, the ratio of acid ester to styrene being 60:40. Other heteropolymers which may be used, with advantage, are the copolymers of styrene and the partial methylamyl ester of polymerizable, unsaturated polycarboxylic acid. Such copolymers of styrene and the partial butyl esters of maleic acid, or of maleic anhydride have been used with particular advantage. Heteropolymers of the types just noted are generally available to the industry and may be procured in the open market.

Instead of the partial esters of maleic acid, the partial esters of any α,β-unsaturated acid, or other unsaturated polymerizable polycarboxylic acid may be used, for instance, itaconic or fumaric. Also instead of partial butyl esters, the partial esters of any other monohydric alcohols may be used, advantageously alcohols containing 1 to 8 carbon atoms per molecule.

The proportion of styrene to partial ester in the heteropolymer is also subject to considerable variation, advantageously being within the range of 30:70 to 60:40 but preferably about 40:60.

Thermo-setting resins which have been used with particular advantage include butylated melamine-formaldehyde resins, butylated urea-formaldehyde resins, and thermo-setting alkyd resins, and various mixtures of these particular resins.

In forming the resin complex of our present invention, it is necessary that alcohol, or a compound containing an alcohol residue, i. e., an alkyl radical, be present in the mixture. The alkyl radical may be supplied by using an alkylated thermo-setting resin, or the alcohol may be supplied as such as an alcohol suspension or solution of the thermo-setting resin or of the heteropolymer. The alcohol may frequently be introduced, with advantage, by mixing it with the pigment to wet the pigment prior to the adding of either of the resin constituents. We have, with particular advantage, used butanol as the alcohol. However, it will be understood that, in place of butanol, other monohydric alcohols may be used, for instance, such alcohols containing from 1 to 8 carbon atoms per molecule, or mixtures of alcohols. The proportion of alcohol so used may be varied somewhat, but should be within the range of 1:0.15 to 1:1, preferably about 1:0.25 based on the weight of the thermo-setting resin. The necessary alkyl radical may be supplied as the alcohol, or by any one or more of the methods just noted.

The ratio of heteropolymer to thermo-setting resin may also be varied somewhat. We have found, however, that where this ratio is greater than 1:1.6, the resultant coating on the fabric is not laundry-fast and where this ratio is less than about .25:2 the resultant coating tends to be brittle. We have generally found the optimum proportion to be about .25:1, by weight.

Where a pigmented coating is to be obtained, the pigment will be bound to the fibers by the thermo-setting resin, and therefore the ratio of thermo-setting resin to pigment in the emulsion is also of importance. We have found equal parts, by weight, of thermo-setting resin and dry pigment to give especially satisfactory results. However, this ratio may, with advantage, vary within the range of .4:1 to 2:1.

The pigment is first uniformly dispersed either in the thermo-setting resin or in the heteropolymer, either with or without a preliminary wetting of the pigment with alcohol. Where the pigment is in the form of a wet presscake, the water may be flushed from the pigment by wetting the pigment with either the thermo-setting or the heteropolymer. These resins being immiscible with water will effect a separation of water from the remainder of the mixture, as more fully described in our copending application just noted. In effecting this dispersion of wet pigment in the resin constituent, it is advantageous to add to the mixture an organic pigment dispersing agent such, for instance, as an aqueous solution of sulfonated phenol-formaldehyde resin. Where dry pigment is used, the use of such dispersing agent is unnecessary.

The dispersion of the pigment in the resin constituent is, with advantage, accomplished by mixing in an internal friction mixer such, for instance, as the Werner-Pfleiderer, or the Baker-Perkins mill. Advantageously the pigment is first thoroughly wetted with a portion only of an alcohol solution of one of the resin constituents, the thermo-setting resin, for instance. Thereafter, the remainder of the thermo-setting resin solution is added with mixing until the pigment has been thoroughly dispersed therein.

Following the uniform pigmenting of one of the resin constituents, the other resin constituent is added to and thoroughly mixed and worked with the pigmented resin.

Upon mixing the heteropolymer and the thermo-setting resin and working the mixture as a non-aqueous system, a new and different resin complex is formed. While we cannot, at present, describe with any degree of certainty the nature of the reaction, we have observed that, after the heteropolymer and the thermo-setting resin have been worked for an extended period, say about 30 minutes, the mass becomes thick and elastic, somewhat resembling rubber. The physical qualities of the resin complex are quite different from those of either of the resin constituents and the interaction product appears to be a new and materially different resin.

This working step is, with advantage, carried out at a temperature of at least 50° C. but not sufficiently high to drive off all of the solvent present. Best results have been obtained at a working temperature of 50°–80° C., the maximum temperature depending upon the volatility of the solvent.

This new resin complex is readily emulsified, or extended in water and is useful for various purposes. Aqueous emulsions prepared therefrom are not sufficiently stable to permit shipment and prolonged storage but are serviceable for immediate use.

Where a stable aqueous emulsion is to be prepared after the resin complex has assumed the thick elastic condition above described, water is added with thorough mixing to reduce the consistency of the complex. Usually at this point, it is desirable to add only a portion of the water to be used in the finished emulsion adequate to reduce the viscosity of the mass to permit further treatment.

When the mass has been reduced to a suitable viscosity, there is added an emulsifier and a base material, the latter for the purpose of neutralizing the acid radical of the heteropolymer portion of the complex. The order in which the emulsifying agent and the base material are added is not of primary importance.

The emulsifier may be any one of the known anionic, nonionic, or cationic emulsifiers available to the industry, and, in order to effect an optimum shelf stability, should be used in proportions not less than about 0.25 or more than 0.75 part of emulsifier for each part of dry pigment.

The base material is, with advantage, one which will neutralize the acid radicals of the complex without forming an insoluble residue. Aqueous ammonia of 28° Bé. has been used for this purpose with particular advantage. Also, primary or secondary amines may be used as the base material and even caustic soda, or the like, may be used where the presence of an insoluble salt is not objectionable. The proportion of the base material used should be adequate to neutralize substantially all of the carboxyl groups of the heteropolymer portion of the complex. However, somewhat less or greater proportions of the base material may be used. For example, where aqueous ammonia is used, the proportion should be within the range equivalent to 20% to 100% of $NH_3$ based on the weight of the heteropolymer. Where some other base is used, a chemically equivalent proportion should be added. The optimum proportion will depend upon the type of emulsifier added.

Where the adding of the emulsifier precedes the neutralizing of the carboxyl groups of the complex, the emulsifier may be added and thoroughly mixed with the aqueous dispersion of the resin complex. Thereafter a further portion of water may be added with vigorous mixing. The base material may then be added, followed by the remainder of the water required for the emulsion with continued agitation.

The heteropolymer portion of the resin complex is solubilized by the action of the base material. The resultant water soluble heteropolymer portion of the complex is thereby rendered emulsifiable and appears to act as a protective colloid for the thermo-setting portion of the resin complex of the finished emulsion, and to assure complete stability of the emulsion until it has been applied to the fabric. Finally, the curing of the resin complex on the fabric results in a liberation of a portion of the heteropolymer constituent of the complex, which is water soluble and may be readily removed from the fabric by simple soap washing.

As previously noted, following neutralizing of the carboxyl radicals of the complex, the remaining portion of the water is added with agitation, to produce the finished stable emulsion. Normally, the total water content of the emulsion should be within the range of about 38% to about 51% by weight of the emulsion to give a stable emulsion product. In general, only sufficient water should be added to assure a complete inversion to an emulsion in which water is a continuous phase.

Where it is desired to impart special properties to the coated fibers, for instance, to make them more water repellent, various resins known to have the desired coating property may be mixed with the finished emulsion just described. Such mixing is, with advantage, effected by forming a separate emulsion of the resin or resins to be added and then mixing the separately prepared emulsion with the stable emulsion of our present invention. Where such additional resins are added in moderate amounts, for instance, in proportions not greater than 0.375 times the weight of the resin complex, the stability of the emulsion is not seriously impaired.

Resins of the thermo-plastic type have in this way been incorporated in the emulsions of our resin complexes. One such resin which has been used, with advantage, is that composed of copolymers of butadiene and acrylonitrile. Other resins which may, with advantage, be added in this manner are copolymers of acrylonitrile and vinyl chloride, polymerized vinylidene chloride, and polyester polyamides, such as available under the trade name "nylon."

The invention will be more particularly illustrated by the following specific examples. It will be understood, however, that these examples are not limitative.

*Example I*

In this operation Benzidene Yellow was used as a pigment. The thermo-setting resin used was a butylated melamine-formaldehyde resin. It was used as a solution composed of 55% resin dissolved in equal parts of butanol and xylol. The heteropolymer used was a copolymer of 40% styrene and 60% of a partial secondary butyl ester of maleic acid containing free carboxyl groups, a dry powder. The emulsifying agent was an alkyl aryl polyether alcohol. The base material was 28° Bé. ammonium hydroxide.

2200 grams of a presscake of the pigment containing 1800 grams of water was first mixed with 100 grams of a 40% aqueous solution of a sulfonated phenol-formaldehyde resin as a pigment dispersing agent, until all of the pigment was well wetted and then with 400 grams of the thermo-setting resin solution. This resulted in the flushing of the water from the pigment which was drawn off. By this means a total of 1850 grams of the water was removed.

After discarding the water, the pigment and resin were further thoroughly mixed in a Werner-Pfleiderer mixer and an additional 400 grams of the thermo-setting resin was added and thoroughly mixed with the pigment mixture in the machine to give a uniform dispersion of the pigment in the resin. There was then added to the resultant pigmented thermo-setting resin 100 grams of the heteropolymer and the mixing continued for about 30 minutes, at the end of which period the mass became thick and elastic, resembling rubber. 400 grams of water was then slowly added and worked into the mass and thereafter 100 grams of the emulsifier was added and uniformly dispersed in the mass. The acidity of the acid ester was then neutralized and the ester rendered water soluble by adding 100 grams of 28° Bé. ammonium hydroxide and, following this, an additional 900 grams of water was added with further vigorous mixing.

The resultant emulsion, in which water was the continuous phase, was found to be completely stable and adapted to use in the printing, dyeing, or coating of fabrics.

Stable emulsions were also prepared by the process just described from the materials and proportions thereof set forth in the following examples, the several materials being added in the order in which they appear in the respective tabulations.

*Example II*

| | |
|---|---|
| Phthalocyanine Blue (dry) | 400 |
| Butanol | 200 |
| Heteropolymer (dry) | 100 |
| Thermo-setting resin solution | 800 |
| Water | 400 |
| Emulsifying agent | 100 |
| Water | 900 |
| Ammonium hydroxide, 280 Bé | 200 |

In this operation, the heteropolymer and emulsifying agent were the same as those used in Example I. The thermo-setting resin solution used was a solution of 65% pure phthalic alkyd resin, in 35% xylol. The pigment was first wetted with butanol and then mixed with the heteropolymer before mixing with the thermosetting resin.

*Example III*

| | |
|---|---|
| Phthalocyanine Green (dry) | 400 |
| Thermo-setting resin solution (A) | 400 |
| Butanol | 50 |
| Heteropolymer (dry) | 100 |
| Thermo-setting resin solution (B) | 400 |
| Water | 400 |
| Emulsifying agent | 100 |
| Water | 700 |
| Ammonium hydroxide, 28° Bé | 200 |

The heteropolymer and the emulsifying agent were the same as those used in Example I. The thermo-setting resin solution (A) was the same as that used in Example II. Following the addition of the heteropolymer thermo-setting resin solution (B) was added, the identity of which was the same as that used in Example I.

*Example IV*

In this example the procedure was varied from that of the foregoing examples in that the order of mixing was somewhat different. The pigment was Phthalocyanine Blue. 1410 grams of a presscake of the pigment containing 1010 grams of water was first wetted with 100 grams of the dispersing agent used in Example I and mixed with an alcoholic solution of 350 grams of the heteropolymer used in Example I containing 15% solids in an alcoholic mixture of 20% butanol and 80% xylol, resulting in the flushing from the pigment all but 60 grams of the water present. There was then added 110 grams of oleic acid. The pigmented heteropolymer was then mixed with 100 grams of the thermo-setting resin solution identified in Example III as thermo-setting resin solution (A) and 55 grams of triethanolamine, the latter for the purpose of emulsifying the carboxyl group of the oleic acid. The resultant mixture was then emulsified with 925 grams of water and the acid ester portion of the complex neutralized by mixing therewith 75 grams of 28°Bé. ammonium hydroxide. Finally, after the mixture had been completely emulsified, there was added and dispersed in the emulsion 600 grams of a stable aqueous suspension of 40% of the copolymers of butadiene and acrylonitrile to which there had been added a minor proportion of sodium oleate as a suspension agent. The stability of the resultant mixture of these emulsions was found to be excellent.

*Example V*

A presscake equivalent to 400 grams of solid Phthalocyanine Green was mixed with 200 grams of butanol and 800 grams of the thermo-setting resin solution used in Example I and 400 grams of a stable aqueous suspension of 40% of the copolymers of styrene and butadiene in water to which a minor proportion of sodium oleate had been added as a suspension agent. This resulted in the flushing of the water from the pigment. After removing the water, the pigmented thermo-setting resin was then mixed with 100 grams of the heteropolymer and 100 grams of the emulsifying agent used in Example I. The resultant resin complex was emulsified with 750 grams of water and the acid ester constituent neutralized by adding 190 grams of 28°Bé. ammonium hydroxide.

Instead of the nonionic emulsifying agent used in the foregoing examples, one may use an emulsifying agent of the anionic type, for instance, triethanolamine oleate, or an emulsifier of the cationic type, for instance, an aqueous dispersion of stearyl dimethyl benzyl ammonium chloride.

As previously noted herein, emulsions capable of imparting an exceedingly high degree of water repellent properties to the fabrics as well as an exceedingly high degree of stability against washing with soap or dry cleaning may be prepared by incorporating various water repellent materials in the emulsions of the types previously described herein.

As the water repellent, there may be used a silicone compound marketed by Dow Corning Corporation, under the trade-name DC Antifoam A. In place of this particular water repellent, any of the well-known water repellents such, for instance, as tetrafluorethane, wax emulsions, and the like may be used.

As previously noted herein, various other synthetic resins may be incorporated in the emulsions of our present invention. For instance, synthetic resins adapted to impart special properties, for instance, luster or wear-resistant properties, to the impregnated fabric. For this purpose we may use, for instance, resins, such as copolymers of 40% acrylonitrile and 60% vinyl chloride or copolymers of 25% acrylonitrile and 75% vinyl chloride or copolymers, such as just noted, containing hydroxyl groups, for instance, those marketed under the trade-names Vinylite NYGV, Vinylite NYGL, Vinylite VYHH, or resins of the "nylon" type, such as marketed under the trade-name Nylon DV-45 and Nylon DV-55. Excellent abrasion resistance and resistance to crocking may be obtained by mixing with the emulsion, an emulsion of a resin such as the polymers of vinylidene chloride.

We claim:

1. A method for producing a stable aqueous emulsion of a pigmented resin complex which comprises mixing and reacting a water-insoluble thermosetting resin selected from the group consisting of alkylated melamine-formaldehyde, alkylated urea-formaldehyde, and thermosetting alkyd resins and mixtures of said resins, the alkyl radicals of said -formaldehyde resins containing from 1 to 8 carbon atoms, with a heteropolymer of styrene and a partial ester of an unsaturated, polymerizable polycarboxylic acid, said heteropolymer containing carboxyl groups and one of said resin reactants having been previously pigmented, by working the mixture as a non-aqueous system containing a monohydric alcohol of 1 to 8 carbon atmos under conditions of vigorous internal friction and continuing the working until the mixture has assumed a thick, elastic consistency, adding water and an emulsifier to the reaction mixture and thoroughly mixing them therein by continued working, thereafter neutralizing the carboxyl radicals of the heteropolymer portion of the complex by reacting with a base material and adding further water with agitation, the total amount of water added being sufficient to effect the inversion of the emulsion to one in which water is the continuous phase.

2. A method for producing a stable, aqueous emulsion of a pigmented resin complex which comprises mixing and reacting a water-insoluble thermosetting resin selected from the group consisting of alkylated melamine-formaldehyde, alkylated urea-formaldehyde, and thermosetting alkyd resins and mixtures of said resins, the alkyl radicals of said -formaldehyde resins containing from 1 to 8 carbon atoms, with a heteropolymer of styrene and a partial ester of an unsaturated, polymerizable polycarboxylic acid, said heteropolymer containing carboxyl groups and one of said resin reactants having been previously pigmented, by working the mixture as a non-aqueous system containing a monohydric alcohol of 1 to 8 carbon atoms under conditions of vigorous internal friction and continuing the working until the mixture has assumed a thick, elastic consistency, adding an emulsifier thereto with continued working to disperse the emulsifier uniformly through the mass, adding water to the mass and thoroughly and uniformly working it into the mass to form an aqueous emulsion in which the water is the discontinuous phase, thereafter neutralizing the carboxyl radicals of the heteropolymer portion of the complex by reacting with a base material and adding further water with agitation, the total amount of added water being sufficient to effect the inversion of the emulsion to one of which water is the continuous phase.

3. A method for producing a stable, aqueous emulsion of a pigmented resin complex which comprises mixing and reacting a water-insoluble thermosetting resin selected from the group consisting of alkylated melamine-formaldehyde, alkylated-urea formaldehyde, and thermosetting alkyd resins and mixtures of said resins, the alkyl radicals of said -formaldehyde resins containing from 1 to 8 carbon atoms, with a heteropolymer of styrene and a partial ester of an unsaturated, polymerizable polycarboxylic acid, said heteropolymer containing carboxyl groups and one of said resin reactants having been previously pigmented, by working the mixture as a non-aqueous system containing a monohydric alcohol of 1 to 8 carbon atoms under conditions of vigorous internal friction and continuing the working until the mixture has assumed a thick, elastic consistency, adding an alkyl-aryl polyether alcohol emulsifier thereto with continued working to disperse said emulsifier uniformly through the mass, adding water to the mass and thoroughly and uniformly working it into the mass to form an aqueous emulsion in which the water is the discontinuous phase, thereafter neutralizing the carboxyl radicals of heteropolymer portion of the complex by reacting with ammonium hydroxide and adding further water with agitation, the total amount of added water being sufficient to effect the inversion of the emulsion to one in which water is the continuous phase.

4. A method for producing a stable, aqueous emulsion of a pigmented resin complex which comprises mixing and reacting a water-insoluble thermosetting resin selected from the group consisting of alkylated melamine- formaldehyde, alkylated urea-formaldehyde, and thermosetting alkyd resins and mixtures of said resins, the alkyl radicals of said -formaldehyde resins containing from 1 to 8 carbon atoms, with a heteropolymer of styrene and a partial ester of an unsaturated, polymerizable polycarboxylic acid, said hetero-polymer containing carboxyl groups and one of said resin reactants having been previously pigmented, by working the mixture as a non-aqueous system containing a monohydric alcohol of 1 to 8 carbon atoms under conditions of vigorous internal friction and continuing the working until the mixture has assumed a thick, elastic consistency, adding oleic acid and triethanolamine thereto with continued working to disperse them uniformly through the mass adding water to the mass and thoroughly and uniformly working it into the mass to form an aqueous emulsion in which the water is the discontinuous phase, thereafter neutralizing the carboxyl radicals of the heteropolymer portion of the complex by reacting with ammonium hydroxide and adding further water with agitation, the total amount of added water being sufficient to effect the inversion of the emulsion to one in which water is the continuous phase.

5. A method for producing a stable, aqueous emulsion of a pigmented resin complex which comprises mixing and reacting a water-insoluble butylated melamine-formaldehyde thermosetting resin with a heteropolymer of styrene and a partial secondary butyl ester of maleic acid, said heteropolymer containing carboxyl groups and one of said resin reactants having been previously pigmented, by working the mixture as a non-aqueous system in the presence of butanol under conditions of vigorous internal friction and continuing the working until the mixture has assumed a thick, elastic consistency, uniformly dispersing oleic acid and triethanolamine through the mass by continued working, adding water to the mass and thoroughly and uniformly working it into the mass to form an aqueous emulsion in which water is the discontinuous phase, thereafter neutralizing the carboxyl radicals of the heteropolymer portion of the complex by reacting with ammonium hydroxide and adding further water with agitation, the total amount of water added being sufficient to effect the inversion of the emulsion to one in which water is the continuous phase.

6. A stable, aqueous emulsion of a pigmented resin complex in which the water is the continuous phase and the dispersed pigmented resin complex is one resulting from the mixing and reacting of a water-insoluble thermosetting resin selected from the group consisting of alkylated melamine-formaldehyde, alkylated urea-formaldehyde, and thermosetting alkyd resins and mixtures of said resins, the alkyl radicals of said -formaldehyde resins containing from 1 to 8 carbon atoms, with a heteropolymer of styrene and a partial ester of an unsaturated, polymerizable polycarboxylic acid, said heteropolymer containing carboxyl groups and one of said resin reactants having been previously pigmented, by working the mixture as a nonaqueous system containing a monohydric alcohol of 1 to 8 carbon atoms under conditions of vigorous internal friction and continuing the working until the mixture has assumed a thick, elastic consistency, uniformly dispersing water and an emulsifier in the reaction mixture and thereafter neutralizing the carboxyl radicals of the heteropolymer portions of the complex by reacting with a base material.

7. A stable, aqueous emulsion of a pigmented resin complex in which water is the continuous phase and the dispersed pigmented resin complex is one resulting from the mixing and reacting of a water-insoluble butylated melamine-formaldehyde thermosetting resin with a heteropolymer of styrene and a partial secondary butyl ester of maleic acid, said heteropolymer containing carboxyl groups and one of said resin reactants having been previously pigmented, by working the mixture as a non-aqueous system containing butanol under conditions of vigorous internal friction and continuing the working until the mixture has assumed a thick, elastic consistency, uniformly dispersing water and an emulsifier in the reaction mixture and thereafter neutralizing the carboxyl radicals of the heteropolymer portion of the complex by reacting with ammonium hydroxide.

8. The emulsion of claim 6 in admixture with an aqueous emulsion of a thermoplastic resin.

9. The emulsion of claim 6 in admixture with a water repellent.

References Cited in the file of this patent

UNITED STATES PATENTS

| | | |
|---|---|---|
| 2,469,408 | Powers | May 10, 1949 |
| 2,486,201 | Patterson | Oct. 25, 1949 |
| 2,537,016 | Barrett | Jan. 9, 1951 |